United States Patent Office 3,425,091
Patented Feb. 4, 1969

3,425,091
SPINNERET AND NOZZLE ASSEMBLY FOR THE MANUFACTURE OF COMPOSITE FILAMENTS
Keizo Ueda, Nishinomiya, and Koetsu Nagata, Kentaro Fujita, and Kazukiyo Iwamoto, Osaka, Japan, assignors to Kanegafuchi Boseki Kabushiki Kaisha, Tokyo, Japan, and Snia Viscosa Società Nazionale Industria Applicazioni Viscosa S.p.A., Milan, Italy
Filed Dec. 12, 1966, Ser. No. 601,009
U.S. Cl. 18—8        5 Claims
Int. Cl. D01d *3/00, 5/00*

ABSTRACT OF THE DISCLOSURE

The disclosure shows an improved spinneret and nozzle assembly including a filter plate having separate inlet chambers for two molten polymers. Two coaxial polymer outlet reservoirs separated by a partition wall integrally formed with the filter plate and having V-shaped ends are connected by passageways with the inlet chambers. The pointed end of the wall is held within a V-shaped groove formed on a nozzle plate without touching the bottom of the groove which has a plurality of orifices formed therein. The axes of orifices are aligned with the center of the groove.

---

This invention relates to a spinneret, more particularly a spinneret usable in so-called conjugate spinning method for simultaneously spinning different kinds of polymers, in which such polymers of different kinds are bonded together while being spun for producing unitary filaments.

In order to manufacture crimped bulky filaments from synthetic fibres made of polymers such as polyamides, polyesters, polyurethanes, polyethylenes, polyvinyls, etc., there have been tried a number of different methods, for instance a mechanical method wherein thermoplasticity of such polymers is utilized, a method of mixed spinning of different polymers, and a so-called conjugate spinning method wherein different polymers are extruded through the same orifice simultaneously to produce a unitary filament in which such different polymers are bonded eccentrically along the axis of the filament. Especially, the conjugate spinning method has been playing a unique role in the textile industry due to the fact that according to said conjugate spinning method, good crimpability is provided to filaments thus spun and at the same time various physical properties thereof can be improved in a single process.

However, such conjugate spinning method has a shortcoming in that extra care is necessary to ensure uniform bondage of the different polymers in each unitary filament, and the uniformity of the bondate largely depends on the structure of a nozzle for such spinning operation. The quality of filaments thus spun is greatly influenced by the construction of the nozzle.

A number of different nozzles have been tried to carry out such spinning operation, however, many of them had structure too complicated or did not take into consideration of uniform flow of molten polymer and uniform bondage of the different polymers. There has not been a practicable nozzle developed for satisfactory simultaneous spinning of different polymers.

The principal object of the present invention is to provide a new spinning nozzle simple and strong in the mechanical structure which can produce composite filaments usable for efficient production of composite filaments having high uniformity.

According to the present invention, a nozzle for production of special synthetic filaments is provided, which comprises a nozzle plate having a plurality of annular grooves having a V-shaped cross-section formed thereon, said annular groove having a depth extremely smaller than the thickness of said nozzle plate, a plurality of orifices bored on the bottom of said annular groove, the centers of said orifices being aligned with the center lines of said annular grooves, and a breaker plate including an annular partitioning wall having a substantially V-shaped cross-section, said annular partitioning wall being fitted in said annular groove without making any tight contact therewith.

For a better understanding of the invention, reference is made to the accompanying drawings, in which:

FIG. 1 is a vertical sectional view of a spinning nozzle according to a first embodiment of the present invention;

FIGS. 2–A and –B are respectively a top view and a bottom view of a breaker plate usable in the spinneret of FIG. 1;

Figure 1:
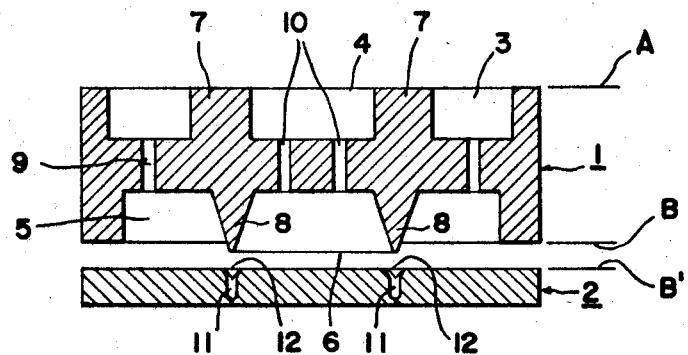
Figure 2A:
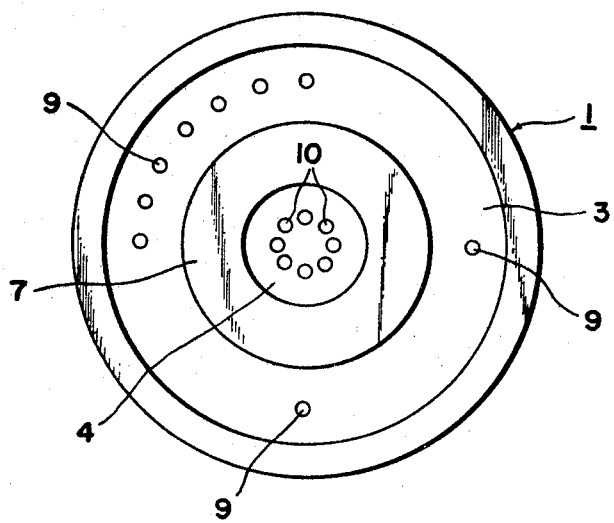
Figure 2B:
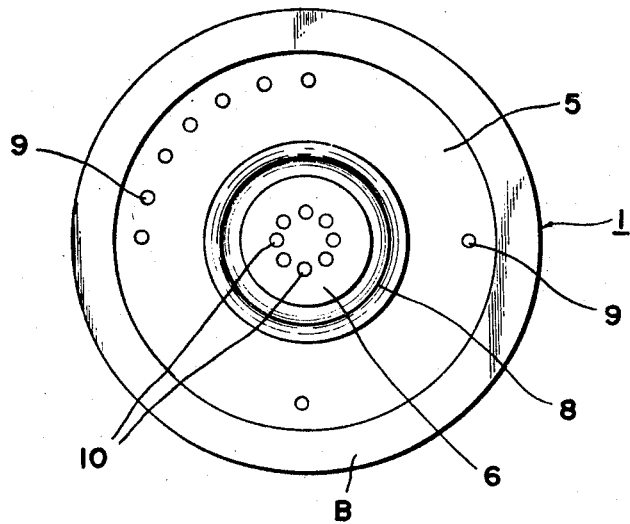
Figure 3:
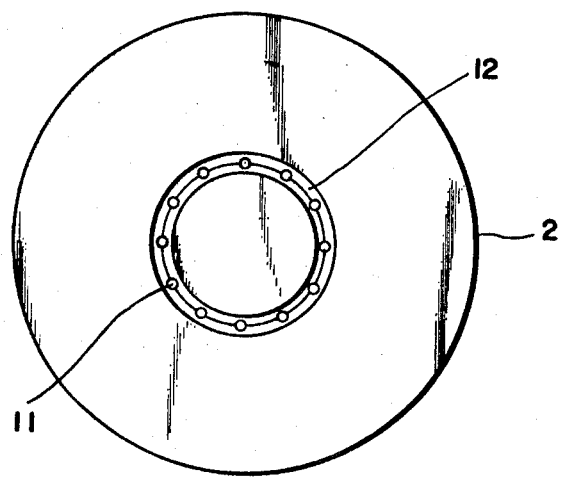
FIG. 3 is a rear view of the nozzle plate of said spinneret.

Referring first to FIGS. 1 to 3, a breaker plate 1 is placed on a nozzle plate 2 so as to bring the lower peripheral surface B of the former into tight contact with the upper peripheral surface B' of the latter. Two different kinds of molten polymers are respectively poured into inlet chambers 3 and 4 of the breaker plate 1 separated by a cylindrical partitioning wall 7 from the upper side A thereof, and the two kinds of polymers thus poured into the breaker member proceed respectively through passageways 9 and 10 into reservoirs 5 and 6 separated by an annular partitioning wall 8 having a V-shaped cross-section.

An annular groove 12 having a V-shaped cross-section is bored on the upper surface of the nozzle plate 2, and a plurality of orifices 11 penetrate through the nozzle plate in such a manner that centers of the orifices are located on the center line of the annular groove 12, as shown in FIG. 3. The depth of the annular groove 12 is selected to be considerably smaller than the thickness of the nozzle plate 2 for ensuring high mechanical strength of the nozzle plate.

The breaker plate 1 is placed on the nozzle plate 2 in such a manner that the lower peripheral surface B of the breaker plate is brought into tight contact with the cooperating upper peripheral surface B' of the nozzle plate 2. Under such conditions, the sharpened lower edge portion of the annular partitioning wall 8 having a V-shaped cross-section formed on the lower surface of the breaker plate 1 is fitted in the annular groove 12 without causing any tight contact between them. To effect such fitting, the angle between two inclined sides of a vertical cross-section of the annular groove 12 is made substantially larger than the angle between two inclined sides of a vertical cross-section of the sharpened lower edge portion of the annular partitioning wall 8. Thus, there are formed gaps between the orifices 11 and the edge portion of the annular partitioning wall 8, which are large enough to allow the simultaneous flow of the two kinds of molten polymers from reservoirs 5 and 6 to the orifices 11 in a laminar fashion along the inclined surfaces of the partitioning wall 8 and the annular groove 12. Thereby, the two kinds of polymers are spun from each one of the orifices 11 to produce unitary filaments comprising said two kinds of polymers bonded together.

The salient feature of the spinning nozzle of the present invention is in the fact that the flow of two kinds of the molten polymers through the orifices 11 are maintained uniformly and continuously by holding the sharpened lower edge portion of the annular partitioning wall 8 formed on the lower side of the breaker plate 1 in loose contact with or in the close vicinity of the bottom of the annular groove 12 bored on the upper surface of the nozzle plate 2, while providing a suitable space between side walls of the partitioning wall 8 and those of the annular groove 12.

Generally speaking, two kinds of polymers to be processed in the conjugate spinning method have different thermal shrinkabilities and different elastic shrinkabilities from each other, and there are various difficult technical problems to be solved in order to pass those two kinds of molten polymers to an orifice simultaneously and continuously at a uniform rate without causing any turbulent flow thereof. Especially, the ratio of the two polymers being bonded together at the orifice, namely the ratio of the flow rates of the two polymers and the difference in viscosity of the two polymers tend to disturb the stable flow lines of the two polymers at the boundary surface thereof when the two polymers join together. Actually, in many cases, uniform filaments are not obtainable, and such failure in obtaining uniform filaments results in considerable reduction in the mechanical characteristics, crimpability, and evenness of filaments thus produced.

According to the spinning nozzle of the present invention, the sharpened end portion of the annular partitioning wall having V-shaped cross-section of the breaker plate is loosely fitted in the annular groove having a V-shaped cross-section without causing any tight contact between the edge and the groove, and the tip end of the partitioning wall is partly inserted into the central portion of the orifices to form a unique nozzle structure different from any of conventional nozzles of the kind, as described in the foregoing. Thus, two kinds of polymers are fed to the orifices very smoothly along the inclined surfaces of the annular partitioning wall and those of the annular groove, and the boundary surface of the two polymers formed upon confluence thereof is well stabilized by the time when thus joined polymers reach the orifices, and the streams of the two polymers thus stabilized is then throttled and spun by said orifices to provide highly homogeneous composite filaments.

Furthermore, the simple and strong construction of the spinning nozzle of the invention comprising a combination of a breaker plate and a nozzle plate makes it easy to disassemble the spinning nozzle for thorough cleaning after the spinning operation is over. Moreover, the nozzle of the invention can be manufactured and assembled with ease. With the multi-spinneret construction of the spinning nozzle of the invention, the spinning operation can be carried out in an extremely efficient manner.

Figure 6:
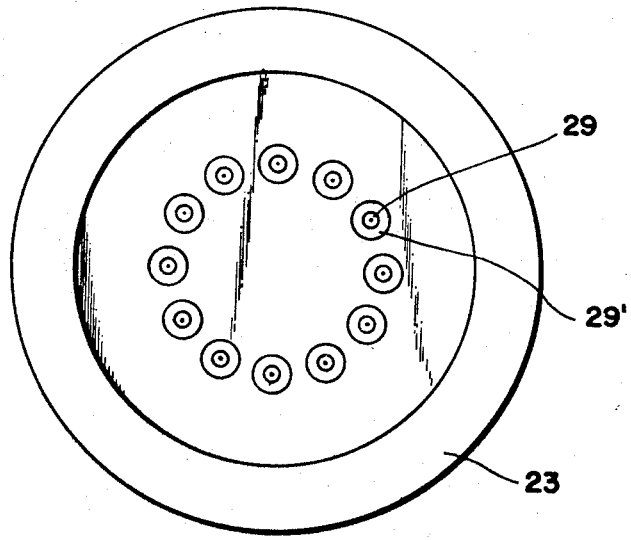
FIG. 6 is a plan view of the nozzle plate of the spinneret of FIG. 4.
Figure 4:
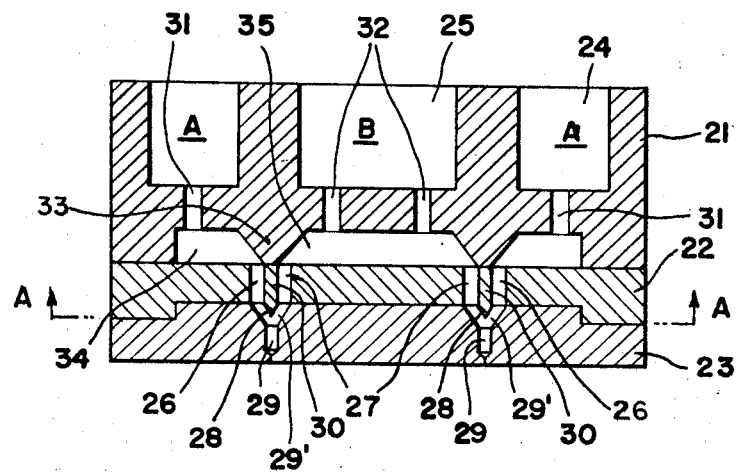
FIG. 4 is a vertical sectional view of a spinneret according to a modified embodiment of this invention.
Figure 5:
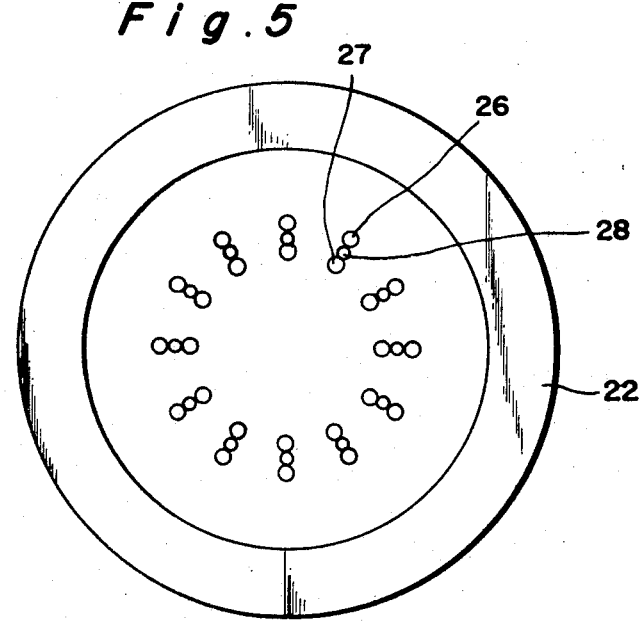
FIG. 5 is a plan view of the breaker plate, taken in the direction of arrows A—A of FIG. 4.

Referring now to FIGS. 4 to 6, a filter plate 21 has separate inlet chambers 24 and 25 for two different polymers A and B, and there are passageways 31 and 32 formed at the bottom of the chambers 24 and 25 respectively for communicating said chamber of reservoirs 34 and 35 separated by an annular partitioning wall 33. A breaker plate 22 is provided with two arcuate passageway groups 26 and 27 for polymers A and B, arranged in a coaxial relation and spaced apart a short distance one from the other to form partitioning wall group 30, the bottom centers of which are provided with projections 28. A nozzle plate 23 has a plurality of conical holes 29′ and a plurality of spinning orifices 29 bored at the centers of the bottoms of each conical hole 29′. Each said projection 28 is adapted to have its tip end fitted in the central portion of each conical hole 29′.

With a spinneret of the aforementioned modified construction according to the present invention, the two different molten polymers A and B are passed through the passageways 31 and 32 of the inlet chambers 24 and 25 of the filter plate 21 and proceeded into reservoirs 34 and 35 separated by the annular partitioning wall 33. Then, the two different polymers A and B are forced into the conical holes 29′ through passageways 26 and 27 of the breaker plate 22, and joined together at the bottom of the conical holes 29′. Thereafter, the two different polymers are spun through spinning orifices 29 to produce so-called composite filaments consisting of the two different polymers bonded together therein.

In the above process of spinning composite filaments, the projections 28 of the breaker plate 22 are fitted in the conical holes 29′ of the nozzle plate 23, thereby the two polymers A and B are distributed uniformly.

As described in the foregoing, according to the invention two different kinds of molten polymers can be spun simultaneously with ease at a uniform rate through spinning orifices without causing any turbulent flow thereof, even when such two kinds of molten polymers have considerably different viscosity or are mixed at a high mixing ratio, and hence, composite filaments of excellent quality can be obtained.

What we claim is:

1. An improved spinneret and nozzle assembly for manufacturing composite synthetic filaments, comprising a filter plate having separate inlet chambers for two kinds of molten polymers, coaxial polymer outlet reservoirs separated from each other by an annular partition wall having at least one cross-sectionally V-shaped edge integrally formed with said filter plate, passages for separately transferring said polymers from said inlet chambers to said outlet reservoirs, and a nozzle plate having at least one cross-sectionally V-shaped groove of a depth considerably smaller than the thickness of said nozzle plate formed therein, a spinning orifice formed in said at least one groove, said orifice being bored so that the axis thereof is aligned with the center line of said at least one groove, the cross-sectionally V-shaped edge of said partition wall being fitted into said annular groove with said cross-sectionally V-shaped edge in spaced relationship with said nozzle plate providing converging passageways for the two polymers, said passageways merging at said orifice.

2. The improved spinneret according to claim 1, wherein said orifice in said nozzle plate has a conical inlet portion.

3. The improved spinneret according to claim 1, wherein a plurality of cross-sectionally V-shaped grooves are formed in said nozzle plate, each of said grooves having a depth considerably smaller than the thickness of said plate, an orifice formed in each of said grooves, the said orifices being bored so that the axes thereof are aligned with the center lines of said grooves, the edge portions of said partition wall having a plurality of sharpened V-shaped cross-sections and being fitted in said annular grooves in spaced relationship with said nozzle plate.

4. The improved spinneret according to claim 3, wherein each of said orifices in said nozzle plate has a conical inlet portion.

5. The improved spinneret according to claim 2, wherein the said orifices in the nozzle plates have conical inlet portions, and wherein a breaker plate is provided between said nozzle plate and said filter plate, the said breaker plate being provided with groups of arcuate passageways for the two polymers, arranged in coaxial relation and spaced apart a short distance from one another by said partition wall, the cross-sectionally V-shaped edge of said partition wall extending into the said orifice.

References Cited

UNITED STATES PATENTS

| | | |
|---|---|---|
| 2,386,173 | 10/1945 | Kulp et al. |
| 2,988,420 | 6/1961 | Ryan et al. |
| 3,006,028 | 10/1961 | Calhoun. |
| 3,073,005 | 1/1963 | Tiede. |
| 3,176,342 | 4/1965 | Davis. |
| 3,192,295 | 6/1965 | Settele. |
| 3,224,041 | 12/1965 | Reynolds. |

FOREIGN PATENTS

| | | |
|---|---|---|
| 23,366 | 7/1962 | Germany. |
| 718,812 | 9/1965 | Canada. |

WILLIAM J. STEPHENSON, *Primary Examiner.*